Sept. 11, 1956    A. BÉGUELIN NEÉ VACHER    2,762,257
APPARATUS FOR PROJECTING KALEIDOSCOPIC IMAGES
Filed March 1, 1955                              2 Sheets—Sheet 1

INVENTOR
ANDRÉE BÉGUELIN NÉE VACHER
By Young, Emery & Thompson
ATTYS.

Sept. 11, 1956  A. BÉGUELIN NEÉ VACHER  2,762,257
APPARATUS FOR PROJECTING KALEIDOSCOPIC IMAGES
Filed March 1, 1955  2 Sheets-Sheet 2
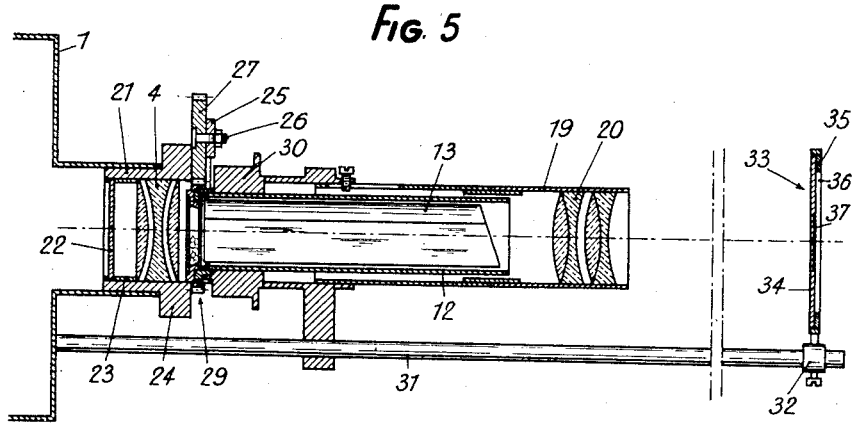
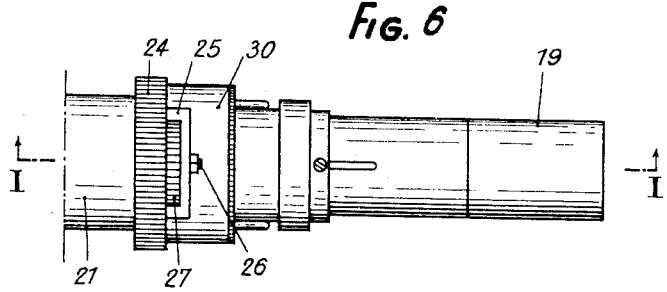
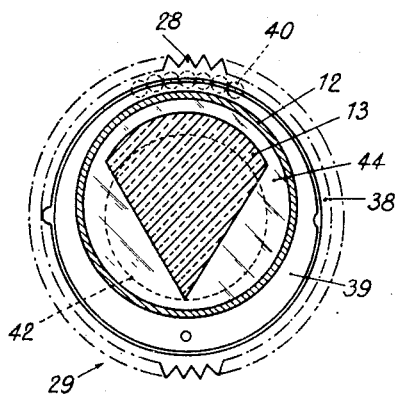
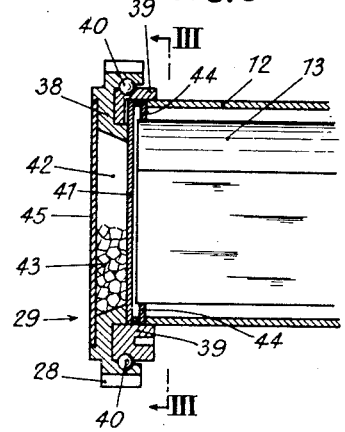
INVENTOR
ANDRÉE BÉGUELIN NÉE VACHER
BY Young, Emery & Thompson
ATTYS.

{ # United States Patent Office 2,762,257
Patented Sept. 11, 1956

2,762,257

APPARATUS FOR PROJECTING KALEIDOSCOPIC IMAGES

Andrée Béguelin, née Vacher, Paris, France

Application March 1, 1955, Serial No. 491,500

Claims priority, application France March 11, 1954

5 Claims. (Cl. 88—24)

The present invention has reference to a new or improved apparatus for projecting kaleidoscopic images.

An object of the invention is to provide a projection apparatus permitting a radiating image or a crown-shaped image lending itself to miscellaneous decorative or ornamental or other possibilities to be obtained on a screen, said image being utilizable among other applications for advertising or displaying purposes, a crown-shaped image, which may for example surround an inscription or another subject matter, forming an advertisement or a display, while a radiating image may be used for decorative purposes, said radiating or crown shape of the image being contrasted to tapestry-like subjects or themes as commonly obtained heretofore.

Another object of the invention is to provide in an apparatus for projecting kaleidoscopic images an optical system capable of producing a radiating or crown-shaped kaleidoscopic image by reflecting and refracting light rays.

A further object of the invention is to provide a new or improved projection apparatus capable of furnishing a practically unlimited diversity of kaleidoscopic images on a screen, which images may be afterwards photographed, for example on a sensitized film with a view to obtaining decorative, displaying or advertising films.

A still further object of the invention is to provide a new or improved apparatus for projecting kaleidoscopic images characterized by the interposition between transparent or translucent colored bodies (illuminated from behind by a light source) and the projection screen of a prism integer having longitudinal edges running parallel to the projection axis and having, moreover, at least one of its end faces inclined to said axis for providing a truncated plane, one of the longitudinal faces of said prism being preferably curved and made dull while its two other faces have reflecting power, whereby besides a multiple reflection of the light rays on the longitudinal faces of the prism as in known kaleidoscopic devices, a refraction of said rays is obtained on said end face forming a truncated plane and whereby moreover the opposite end of one of the prism edges is optically shifted to the centre of the cross section of the prism, this providing on the projection screen a radiating image which permits a central subject or a crown-shaped subject to be obtained.

With these and such other objects in view as will incidentally appear hereafter, the invention comprises the novel construction and combination of parts that will now be described hereafter with reference to the accompanying diagrammatic drawings exemplifying the same and forming a part of the present disclosure.

In the drawings:

Fig. 5 is a part sectional elevational view along the line I—I of Fig. 6 of another constructional form of the projecting apparatus.

Fig. 6 is a plan view of a portion of Fig. 5.

Fig. 7 is a front view of the casing looking along the line III—III in Fig. 8.

Fig. 8 is a longitudinal fragmentary sectional view of the casing shown in Fig. 7.

Figure 1:
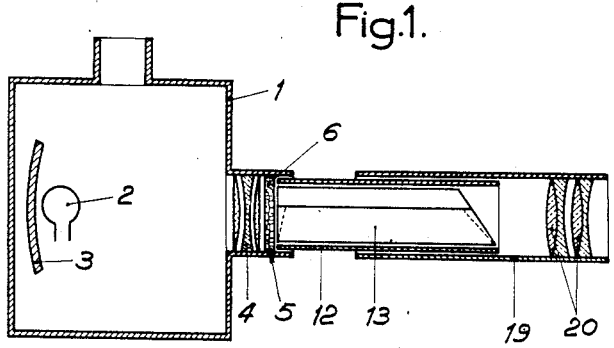
Fig. 1 is a diagrammatic sectional elevational view of an apparatus for projecting kaleidoscopic images according to an embodiment of the invention.
Figure 4:
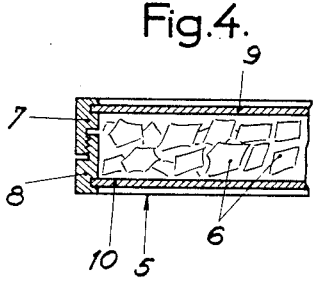
Fig. 4 is a part diagrammatic sectional view of a casing forming the container for colored bodies.

The apparatus shown in Fig. 1 comprises an enclosure 1 containing a source of light 2 associated with a reflector 3 and having a tubular extension in which is housed a light condenser 4. In front of the condenser is arranged a casing 5 containing transparent or translucent colored bodies 6 adapted to furnish the kaleidoscopic image. As clearly visible in Fig. 4, the casing 5 is made up of a pair of tubular screw-threaded elements 7, 8 united by being screwed into each other. One of these elements is closed by a piece of neutral opaline glass 9 extending at right angles to the light source 2, while the other element is closed by a piece of neutral transparent glass 10 directed toward the projecting screen. Advantageously the casing 5 is associated with a device of obvious structure (not shown) by means of which it can be angularly shifted.

Figure 2:
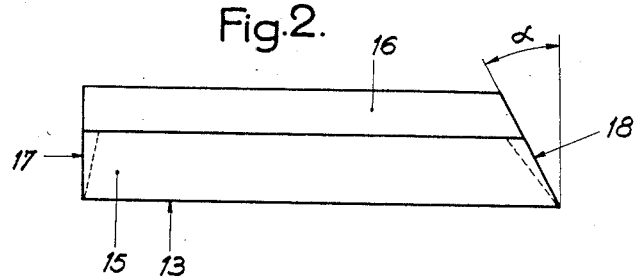
Fig. 2 is an edge view drawn to a larger scale showing the prism forming an integer of the improved projection apparatus.
Figure 3:
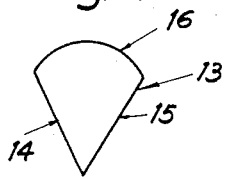
Fig. 3 is a cross sectional view of the prism shown in Fig. 2.

The portion of the tubular extension of the enclosure 1 which protrudes with respect to the casing 5 receives a telescopic tube 12 into which is tucked a projecting prism 13. As clearly visible in Figs. 2 and 3, said prism has two flat faces 14, 15 defining between them an angle equal to 60° and interconnected by a part cylindrical portion 16, the three edges which define said faces extending in true parallelism. On its side adjacent to the casing 5, the prism 13 is delineated by a flat face 17 extending at right angles to its longitudinal axis. On its opposite side, the prism 13 is delineated by an inclined face 18 defining with a line extending normally to said longitudinal axis an angle which is in terms of the prism length and its refraction index, said angle being preferably comprised between 16° and 20°. The length of the prism 13 is preferably equal to four to five times its height. As visible on Fig. 2, the edge formed by the intersection of the flat longitudinal faces 14, 15 has the major length, while the two edges defined between these flat faces and the part cylindrical portion 16 have equal lengths. The part cylindrical portion 16 is rendered dull, for example by being ground or frosted. The length of the prism 13 is proportional to the diameter of the casing 5 and is so calculated as to furnish a full reproduction of the kaleidoscopic image.

The tube 12 also carries a telescopic tube 19 containing projecting lenses 20. The adjustment of the tubes 12 and 19 which have blackened inner faces permits the projection to be properly adjusted or focussed.

The truncated or inclined face 18 of the prism shifts the centre of the kaleidoscopic image onto the projection axis and permits this projection to be performed by means of the optical system.

In the constructional modification illustrated in Figs.
}

5 and 6, the apparatus enclosure is also designated by the reference numeral 1. The optical condenser 4 is fitted in a sleeve member 21 and there is provided ahead thereof a diffuser 22 made of dull glass, a circular reflector 23 constituted for example by a thin polished aluminum plate being so interposed between said diffuser 22 and the condenser 4 as to prevent any loss of light. An outer flange 24 on the sleeve member 21 carries a yoke member 25 through which a pin 26 extends for mounting a toothed wheel 27 (preferably made of molded plastic material) which gears with peripheral teeth 28 (see Figs. 7 and 8) formed on a casing 29. Ahead of the casing 29 is arranged a carrier 30 for mounting a tube 19 in which the objective 20 is supported. In the carrier 30 is fitted the tube 12 which contains the truncated prism 13.

The enclosure 1 is also provided with a pair of rails 31 along which may run the carrier 30, said rails being also used for mounting, by means of a clampable runner 32 a projection screen generally designated by 33. As clearly visible in Fig. 5, the screen 33 comprises a plate of dull glass 34 directed toward the apparatus and associated with a frame 35 (made for example of a suitable metal alloy) applied thereagainst and having a middle aperture of relatively large diameter for receiving a perfectly transparent glass plate 36 which may be push fitted into it. Said plate 36 is, however, removable and interchangeable and carries on its face adjacent the dull glass a display, advertising or other subject matter as indicated by 37.

When using the apparatus, the kaleidoscopic image formed by the optical system is projected upon the screen 33 and is then optically combined with the subject matter 37 (whether a display or advertisement) whereupon the composite image thus obtained may be photographed from that face of the screen 33 more remote from the apparatus. Photographs or advertising or other films may be obtained in that way and may be projected in public rooms, the subject matter 37 being then combined in the desired way with a kaleidoscopic subject or theme of radiating or crown effect.

The casing 29 (Figs. 7 and 8) used in the present instance is made up of a pair of primary and secondary elements, 38, 39, preferably constituted by a transparent plastic material. These two elements may be revolved with respect to each other through a medium of a circular set of balls 40 housed in suitable grooves formed in the molded part. Such balls are also used for preventing the two elements 38 and 39 from being unduly separated. The element 39 is formed with a recess the wall of which is push fitted over the tube 12 housing the prism 13, the push fit being ensured to a predetermined relative position.

As is clearly visible in Figs. 7 and 8, the recess is eccentered with respect to the element 39 for a reason which is indicated hereafter. The bottom of said recess is closed off by a transparent removable disc 41 arranged in front of the flat face of the prism and a reflector 44 arranged between said prism and said tube 12. The other element 38 provides in its centre a cavity 42 extending concentrically to the periphery of the casing 29 and adapted to receive transparent or translucent bodies 43. Said other element is closed by a transparent element 45 fitted in a fashion of a watch-glass and arranged in front of the light source. It will be seen from Fig. 7 that the edge of the cavity 42 (which has a slightly reentrant shape as visible in Fig. 8) substantially coincides with the longitudinal edge of the prism defined by its two flat faces while being located rearwardly of the curvilinear face of said prism, whereby parasitic reflections are staved off. Such relative position is preserved owing to the eccentricity of the recess in the element 39 when the companion element 38 is driven by the toothed wheel 37 for changing the resultant kaleidoscoptic subject.

Preferably the tube 12 which serves as a container for the prism 13 may assume either of two positions spaced from each other by 180°. In the position illustrated in Fig. 7, the bodies 43 are close to the sharp edge of the prism, whereby a radiating kaleidoscopic subject is obtained while in the reverse position a crown-like subject is obtained which is particularly suitable for being combined with a central advertising subject or theme.

The apparatus may be provided with a revolving plate or turret or a similar pivotally mounted contrivance carrying a plurality of boxes or casings containing different combinations of transparent or translucent bodies, the apparatus itself being so constructed as to permit, owing to a rotation of said plate or turret the substitution of any casing or box for any other one, thereby multiplying the kaleidoscopic subjects which are obtainable.

Minor constructional details may be modified without departing from the scope of the subjoined claims.

What is claimed is:

1. An apparatus for projecting kaleidoscopic images by causing light rays to pass through transparent and translucent bodies comprising a source of light, an optical condenser, a diffuser arranged upwardly of said condenser considering the path of the light rays, a casing for housing said bodies and furnishing the kaleidoscopic image, said casing being arranged behind said condenser, a projecting objective, a projecting kaleidoscopic prism interposed between the casing and objective, the longitudinal edges of the prism extending parallel to the optical axis of the objective, the said prism having a pair of flat faces defining between them a longer edge and an arcuate face in the shape of a part cylinder defining with each flat face a shorter edge, the end face of the prism closer to the objective being inclined to the optical axis of the objective, and a translucent screen arranged in front of the objective and spaced therefrom, whereby the kaleidoscopic image projected on said screen can be photographed or viewed from its face remote from the objective.

2. An apparatus for projecting kaleidoscopic images according to claim 1, wherein said translucent screen includes a primary dull glass plate and a highly transparent secondary plate in contact with the primary plate, said secondary plate carrying a subject adapted to be optically combined with the kaleidoscopic image projected upon the screen.

3. An apparatus for projecting kaleidoscopic images by causing a beam of light rays to pass through transparent and translucent bodies comprising a light source, an optical condenser, a light diffuser mounted before said condenser in the path of the light beam, a casing for housing said bodies furnishing the kaleidoscopic image, said casing being arranged behind the condenser, a projection objective, and a projecting kaleidoscopic prism interposed between the casing and the objective, the longitudinal edges of the prism being parallel to the optical axis of the objective, said prism including a pair of flat faces defining between them a longer edge and an arcuate face in the shape of a partial cylinder delineating with each of said flat faces a shorter edge, the end face of the prism directed toward the objective being inclined to the optical axis of said objective.

4. An apparatus for projecting kaleidoscopic images according to claim 3, in which the casing is made up of a primary and secondary element, the former being angularly movable with the prism, while the latter is revolvable about the former, and means for revolving the secondary element for altering the resultant kaleidoscopic image.

5. An apparatus for projecting kaleidoscopic images according to claim 3, wherein the casing is made up of a primary element and a secondary element, a circular set of balls interposed between said elements for permitting them angularly to move relative to each other, means interconnecting the primary element and the prism for joint angular motion, further means for revolving the secondary element, and a cavity in the secondary element for housing the transparent and translucent bodies so that rotation of the secondary element modifies the position of said bodies and consequently the resultant kaleidoscopic image.

References Cited in the file of this patent

UNITED STATES PATENTS

| | | |
|---|---|---|
| 1,232,466 | Milgrom et al. | July 3, 1917 |
| 1,294,967 | Stabla | Feb. 18, 1919 |
| 1,454,691 | Riddell et al. | May 8, 1923 |
| 1,990,867 | Harvey | Feb. 12, 1935 |
| 2,038,909 | Smith et al. | Apr. 28, 1936 |
| 2,099,904 | Pennington et al. | Nov. 23, 1937 |

FOREIGN PATENTS

| | | |
|---|---|---|
| 397,171 | Germany | June 26, 1924 |
| 411,350 | Germany | Mar. 26, 1925 |
| 453,832 | Italy | Dec. 19, 1949 |